United States Patent Office 3,278,461
Patented Oct. 11, 1966

3,278,461
SILICON-SILICON POLYMERS
Tse C. Wu, Waterford, N.Y., assignor to General Electric Company, a corporation of New York
No Drawing. Filed Aug. 1, 1963, Ser. No. 299,154
6 Claims. (Cl. 260—2)

This invention relates to new and useful organosilicon polymers. More particularly, it relates to organosilicon polymers characterized by the presence of both divalent aromatic groups and silicon-silicon linkages in the polymer chain.

It is well known in the organosilicon art that the silicon-silicon linkage is weaker than the more conventional siloxane linkages found in conventional silicone polymers. This inherent weakness in the silicon-silicon bond has prevented the development of polymers containing silicon-silicon bonds which have had adequate strength and thermal stability, particularly in oxidizing atmospheres. The present invention is based on my discovery that it is possible to prepare useful polymeric materials containing silicon-silicon linkages by incorporating other groups in the polymer chain which permits the formation of relatively strong polymeric materials while still retaining certain of the desirable attributes of materials containing silicon-silicon linkages. The most desirable attribute of the silicon-silicon bond is that it acts as a "scavenger" of oxygen so that at elevated temperatures, particularly in oxidizing atmospheres, the material containing silicon-silicon bonds is not destroyed by oxygen. The oxygen merely reacts with the silicon-silicon bond under such circumstances to form silicon-oxygen-silicon linkages.

The particular polymers which are the subject of my invention have the formula, (1) 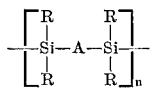

where R is a monovalent hydrocarbon radical, A is a divalent aromatic radical and $n$ is a number greater than 1, e.g., from 3 to 50, or more.

Illustrative of the radicals represented by R in Formula 1 are, for example, alkyl, e.g., methyl, ethyl, propyl, butyl, octyl, etc. radicals; cycloalkyl radicals, e.g., cyclohexyl, cycloheptyl, etc. radicals; alkenyl radicals, e.g., vinyl, allyl, etc. radicals; aryl radicals, e.g., phenyl, naphthyl, xylyl, tolyl, etc. radicals; aralkyl radicals, e.g., benzyl, phenylethyl, etc. radicals; as well as chlorinated monovalent hydrocarbon radicals such as chloromethyl, chlorophenyl, dibromophenyl, etc. radicals. Illustrative of the divalent aromatic radicals represented by A in Formula 1 can be mentioned, for example, the phenylene radical, particularly the p-phenylene radical, the biphenylene radical, e.g., particularly the p,p'-biphenylene radical, the bis(phenylene)oxide radical, particularly the p,p'-bis(phenylene) oxide radical, etc.

In general, the divalent aromatic radical represented by A can also be described consisting of only carbon, hydrogen, and in some cases, also oxygen. Thus, many of these radicals can be referred to as divalent aromatic hydrocarbon radicals or arylene radicals. All of the radicals represented by A are characterized by the presence of two free valences in the aromatic nucleus, which valences are satisfied in the polymers of the present invention by linkages between a silicon atom and a nuclear carbon atom. In the above Formula 1, the R group in any given polymeric material may be the same or different radicals, for example, each silicon atom in the polymer may contain two methyl groups, two phenyl groups, or one methyl group and one phenyl group.

The preferred classes of polymeric materials within the scope of the present invention are those characterized by the formulae:

(2) 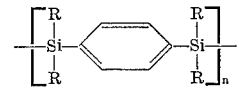

(3) 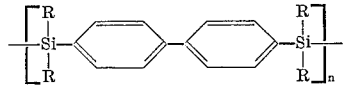

(4) 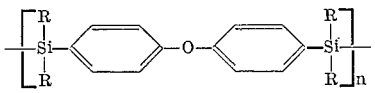

where R and $n$ are as previously defined.

The preferred specific polymeric material within the scope of the present invention corresponds to the polymeric material of Formula 1 where all of the R groups are phenyl and the A group is a p-phenylene group.

The polymeric materials of the present invention can be prepared by fairly straight forward methods. In particular, the reaction to form these materials is best effected by a Wurtz-type reaction involving the appropriate bis(silyl)arylene compound and metallic sodium in a suitable solvent. Thus, for example, the preferred specific polymeric material of the present invention can be prepared by reacting 1,4-bis(diphenylchlorosilyl)benzene with sodium in the presence of xylene. Other polymers within the scope of the present invention can be prepared by reacting sodium with other materials such as p,p'-bis(dimethylchlorosilyl)biphenyl or p,p'-bis(diphenylchlorosilylphenyl)oxide. In effecting reaction between the sodium and the chlorine compound, it is preferred to employ an excess of sodium, such as two to tenfold molar excess, based on the moles of silicon-bonded chlorine atoms in the other reactant. The amount of solvent, such as xylene, employed in the reaction can vary within wide limits and generally from two to ten parts by weight, per part of the other reactants.

The reaction is effected by stirring the reactants at an elevated temperature, for example, a temperature of from about 120 to 180° C. for from 6 to 12 hours and thereafter cooling the reaction mixture to room temperature, adding an excess of methyl alcohol to react with unreacted sodium. This reaction forms sodium methylate which is washed from the reaction mixture by a mixture of water and acetone. The residue is then stripped of xylene to produce the polymeric materials of the present invention. In describing the polymeric materials of the present invention, it is apparent that the polymeric materials are chain terminated with silicon-bonded chlorine atoms. However, because of the high molecular weight of these materials, the presence of the chlorine chain-stopping can be disregarded.

The following examples are illustrative of the practice of my invention and are not for purposes of limitation. All parts are by weight.

Example 1

A mixture of 10.2 parts of 1,4-bis(diphenylchlorosilyl) benzene, 1 part of sodium and 25 parts of xylene was stirred at 140° C. to 150° C. for 12 hours whereupon the reaction mixture was allowed to cool to room temperature and treated with methyl alcohol to consume the excess sodium. After repeated washings with a mixture of water and acetone, the residue was dried in an oven to produce 7.4 parts of white polymeric solid. The material was soluble in hot xylene, hot pyridine and hot diphenyl ether, and upon heating it did not melt but discolored slightly at above about 500° C. This material has the formula:

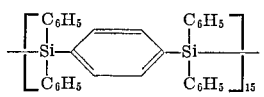

*Example 2*

Following the procedure of Example 1, with 26.3 parts of 1,4-bis(dimethylchlorosilyl)benzene replacing the 1,4-bis(diphenylchlorosilyl)benzene, there was obtained 17.8 parts of white polymer powder melting at 270° C. which remained unchanged in the liquid state at up to over 500° C. Examination of this material showed it to have the structure:

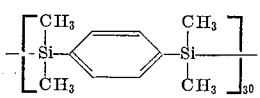

The materials of the present invention vary from materials which do not melt at temperatures as high as 500° C. to materials which melt at temperatures of the order of 270° C., depending upon the molecular weight, the particular R groups present, and the particular organic groups attached to silicon and the particular arylene radical present in the polymer. Those materials which melt at temperatures of about 270° C. to 400° C. are particularly useful as additives in silicone fluids employed in high temperature applications. For example, incorporation of about 5% by weight of these fluids to a methylphenylpolysiloxane fluid as a heat transfer fluid or high temperature hydraulic fluid vastly increases the useful working life of such base fluids and increases the temperature at which these base fluids can operate. This increase in life and operating temperautre is attributed to the presence of the silicon-silicon linkages in the polymeric materials which, as previously described, act as a scavenger for oxygen which might normally attack the base silicone fluid.

The polymeric materials within the scope of the present invention which are solid at temperatures up to 400 to 500° C. are particularly useful as insulation for electrical conductors and can be added to such conductors by dissolving the polymers in a suitable solvent such as diphenyl ether applying the diphenyl ether solution to a copper conductor and evaporating the solvent. This results in a tough insulating film on the copper conductor. In addition, the solid materials can advantageously be incorporated into conventional methylphenyl silicone resins to improve the thermal stability of such resins.

What I claim as new and desire to secure by Letters Patent of the United States is:

1. A polymeric material consisting essentially of from about 3 to 50 recurring units having the formula:

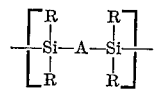

where R is a member selected from the class consisting of alkyl, cycloalkyl, alkenyl, aryl, and aralkyl radicals, and A is a divalent aromatic radical.

2. A polymeric material consisting essentially of from 3 to 50 recurring units having the structure:

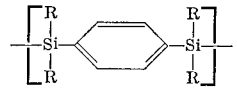

where R is a member selected from the class consisting of alkyl, cycloalkyl, alkenyl, aryl, and aralkyl radicals.

3. A polymeric material consisting essentially of from about 3 to 50 recuring units having the structure:

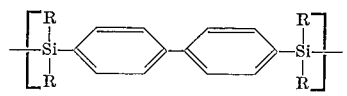

where R is a member selected from the class consisting of alkyl, cycloalkyl, alkenyl, aryl, and aralkyl radicals.

4. A polymeric material consisting essentially of from 3 to 50 recurring units having the structure:

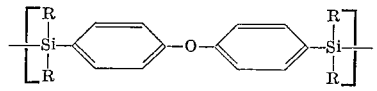

where R is a member selected from the class consisting of alkyl, cycloalkyl, alkenyl, aryl, and aralkyl radicals.

5. A polymeric material consisting essentially of from about 3 to 50 recurring units having the structure:

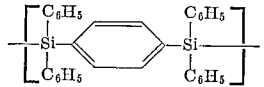

6. A polymeric material consisting essentially of from about 3 to 50 recurring units having the structure:

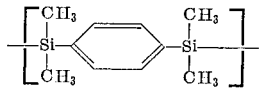

References Cited by the Examiner

UNITED STATES PATENTS 3,187,029   6/1965   Omietanski _____ 260—46.5
3,187,031   6/1965   Weyenberg _____ 260—46.5
3,187,032   6/1965   Weyenberg _____ 260—46.5

OTHER REFERENCES

Eaborn: Ogranosilicon Compounds, New York, Academic Press, Inc., 1960, pages 470–1.

LEON J. BERCOVITZ, *Primary Examiner.*

SAMUEL H. BLECH, *Examiner.*

M. I. MARQUIS, *Assistant Examiner.*